United States Patent
Chen et al.

(10) Patent No.: US 10,742,902 B2
(45) Date of Patent: Aug. 11, 2020

(54) TRACKING SYSTEM AND TRACKING METHOD THEREOF

(71) Applicant: HTC Corporation, Taoyuan (TW)

(72) Inventors: Yuan-Tung Chen, Taoyuan (TW);
Hsu-Hong Feng, Taoyuan (TW);
Tzu-Yin Chang, Taoyuan (TW);
Wei-Ta Wang, Taoyuan (TW);
Tzu-Chieh Yu, Taoyuan (TW)

(73) Assignee: HTC Corporation, Taoyuan (TW)

(*) Notice: Subject to any disclaimer, the term of this patent is extended or adjusted under 35 U.S.C. 154(b) by 0 days.

(21) Appl. No.: 15/978,204

(22) Filed: May 14, 2018

(65) Prior Publication Data

US 2018/0332240 A1    Nov. 15, 2018

Related U.S. Application Data

(60) Provisional application No. 62/505,136, filed on May 12, 2017.

(51) Int. Cl.
*H04N 5/33* (2006.01)
*G06F 3/0346* (2013.01)
(Continued)

(52) U.S. Cl.
CPC .............. *H04N 5/33* (2013.01); *G06F 3/033* (2013.01); *G06F 3/0304* (2013.01);
(Continued)

(58) Field of Classification Search
CPC . G06T 7/20; G06T 7/246; G06T 7/292; G06F 3/01–3/0346; G06F 3/011; H04N 5/33
See application file for complete search history.

(56) References Cited

U.S. PATENT DOCUMENTS

2008/0211916 A1* 9/2008 Ono ................. G08B 13/19643
348/164
2008/0292151 A1* 11/2008 Kurtz ..................... G16H 15/00
382/128

(Continued)

FOREIGN PATENT DOCUMENTS

EP    2600285 A2    6/2013
EP    2711812 A1    3/2014

(Continued)

OTHER PUBLICATIONS

Tianren Wang et al., "Infrared Marker Based Augmented Reality System for Equipment Maintenance", 2008 International Conference on Computer Science and Software Engineering, IEEE, Piscataway, NJ, ISA, Dec. 12, 2008, pp. 816-819.

(Continued)

*Primary Examiner* — Robert J Hance
(74) *Attorney, Agent, or Firm* — CKC & Partners Co., LLC (57) ABSTRACT

A tracking system is provided. The tracking system comprises a trackable device which comprises a first illuminating module and the first illuminating module emits an infrared (IR) light and a tracking device which comprises an optical sensing module and a processor. The optical module is configured to sense an IR spectrum to capture a first image and sense a visible spectrum to capture a second image, and the IR light is in the IR spectrum. The processor is coupled to the optical sensing module. The processor is configured to search in the first image a first region corresponding to the IR light, locate in the second image a second region associated with the first region in the first image, and calculate a spatial status of the trackable device according to the second region in the second image.

14 Claims, 7 Drawing Sheets

(51) Int. Cl.
*H04N 5/14* (2006.01)
*G06T 7/20* (2017.01)
*H04N 5/232* (2006.01)
*H04N 5/235* (2006.01)
*G06K 9/00* (2006.01)
*G06T 7/73* (2017.01)
*H04N 5/247* (2006.01)
*G06T 7/246* (2017.01)
*G06F 3/03* (2006.01)
*G06F 3/033* (2013.01)
*G06T 7/292* (2017.01)

(52) U.S. Cl.
CPC ....... *G06F 3/0346* (2013.01); *G06K 9/00664* (2013.01); *G06T 7/20* (2013.01); *G06T 7/246* (2017.01); *G06T 7/292* (2017.01); *G06T 7/73* (2017.01); *H04N 5/145* (2013.01); *H04N 5/2354* (2013.01); *H04N 5/23216* (2013.01); *H04N 5/23218* (2018.08); *H04N 5/23229* (2013.01); *H04N 5/247* (2013.01); *H04N 5/332* (2013.01); *G06T 2207/10024* (2013.01); *G06T 2207/10048* (2013.01); *G06T 2207/30204* (2013.01)

(56) References Cited

U.S. PATENT DOCUMENTS

| | | | | |
|---|---|---|---|---|
| 2009/0268033 | A1* | 10/2009 | Ukita | G06T 7/292 348/169 |
| 2012/0259638 | A1* | 10/2012 | Kalinli | G10L 25/78 704/270 |
| 2013/0002550 | A1* | 1/2013 | Zalewski | G06F 3/033 345/158 |
| 2014/0062882 | A1* | 3/2014 | Ozawa | G06T 3/40 345/158 |
| 2015/0054734 | A1* | 2/2015 | Raghoebardajal | G02B 27/017 345/156 |
| 2016/0252976 | A1* | 9/2016 | Zhang | G06F 3/011 345/156 |
| 2017/0213013 | A1* | 7/2017 | Piron | A61B 5/0084 |
| 2018/0035077 | A1* | 2/2018 | Sato | H04N 1/3877 |
| 2018/0046840 | A1* | 2/2018 | Howell | H04N 7/188 |
| 2018/0197022 | A1* | 7/2018 | Fujikawa | G08G 1/166 |

FOREIGN PATENT DOCUMENTS

| | | | | |
|---|---|---|---|---|
| JP | 2003259362 A | * | 9/2003 | |
| JP | 2003-259362 | * | 12/2003 | ............. H04N 7/18 |
| JP | 2010216829 A | * | 9/2010 | |
| WO | WO-2012157486 A1 | * | 11/2012 | ............. G06F 3/038 |

OTHER PUBLICATIONS

Corresponding extended European search report dated Dec. 19, 2018.

* cited by examiner

TRACKING SYSTEM AND TRACKING METHOD THEREOF

CROSS-REFERENCE TO RELATED APPLICATION

This application claims priority to U.S. Provisional Application Ser. No. 62/505,136, filed on May 12, 2017, which is herein incorporated by reference.

BACKGROUND

Field of Invention

The disclosure relates to a tracking system. More particularly, the disclosure relates to analyze images to track an object.

Description of Related Art

For the development for the image sensor chip technology, applications in industrial or consumer fields, such as product certification, material analysis, biometric verification, and image object tracking, can be achieved on account of the multi-spectrum image sensors. However, after images are sensed, in practical situation, the following image operations and analyzations rely on the image processing technical fields. The problem that high-resolution images consume high image analyzing cost is urgent to be solved.

SUMMARY

The disclosure provides a tracking system comprising a trackable device and a tracking device. The trackable device comprises a first illuminating module, and the first illuminating module emits an infrared (IR) light. The tracking device comprises an optical sensing module and a processor. The optical module is configured to sense an IR spectrum to capture a first image, and sense a visible spectrum to capture a second image, and the IR light is in the IR spectrum. The processor is coupled to the optical sensing module. The processor is configured to search in the first image a first region corresponding to the IR light, locate in the second image a second region associated with the first region in the first image, and calculate a spatial status of the trackable device according to the second region in the second image.

The disclosure also provides a tracking method which is suitable for a tracking system. The tracking system comprises a trackable device and a tracking device, which the tracking device comprises an optical sensing module. The tracking method comprises the following operations: searching a first region a first region corresponding to an IR light in a first image captured by the optical sensing module in an IR spectrum, locating a second region in a second image captured by the optical sensing module in a visible spectrum, wherein the second region is associated with the first region in the first image, and calculating a spatial status of the trackable device according to the second region in the second image.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

Figure 1:
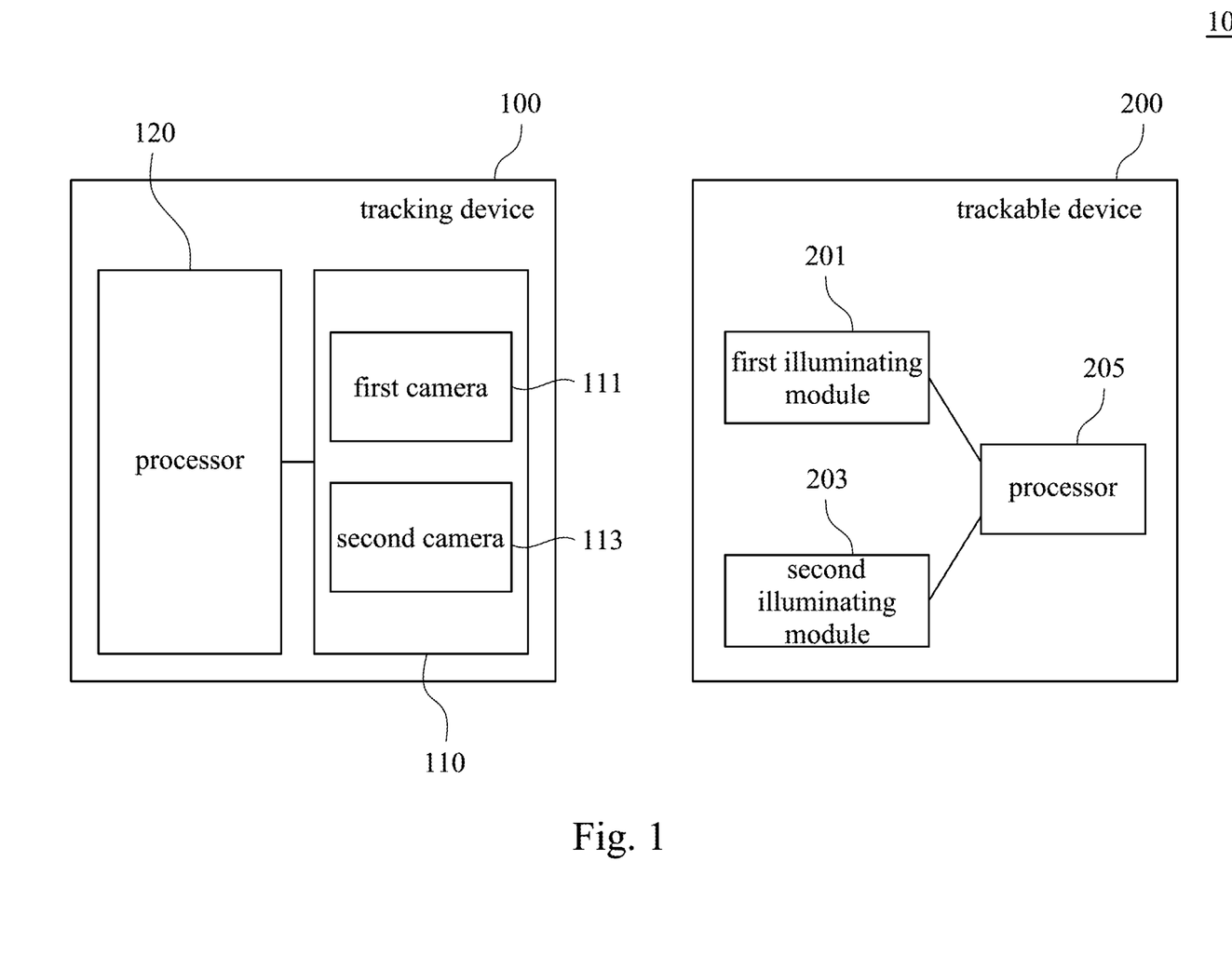
FIG. 1 is a functional block diagram illustrating a tracking system according to an embodiment of this disclosure.

Reference is made to FIG. 1, which is a functional block diagram illustrating a tracking system according to an embodiment of this disclosure. As shown in FIG. 1, the tracking system 10 comprises a tracking device 100 and a trackable device 200. In the tracking system 10, the tracking device 100 operates tracks based on light signals emitted by the trackable device 200.

As shown in FIG. 1, the trackable device 200 comprises a first illuminating module 201, a second illuminating module 203 and a processor 205. The first illuminating module 201 and the second illuminating module 203 are coupled to the processor 205 respectively. The processor 205 is configured to control the first illuminating module 201 and the second illuminating module 203 to emit light in particular spectrum. In some embodiment, the first illuminating module 201 comprises light emitting diode (LED) which emits infrared (IR) light, and the second illuminating module 203 comprises LED which emits visible light. In an embodiment, the first illuminating module 201 is disposed adjacent to the second illuminating module 203.

The tracking device 100 comprises an optical sensing module 110 and a processor 120. The optical sensing module 110 is coupled to the processor 120. The optical sensing module 110 is configured for sensing light of different spectrum and correspondingly generating images. In an embodiment, the optical sensing module 110 is configured for sensing the IR spectrum and capturing a first image and the first image is, for example, grey images. The optical sensing module 110 is also configured for sensing the visible spectrum and capturing a second image and the second image is, for example, color images.

The optical sensing module 110 of the tracking device 100 has a field of views (FOV), the FOV is the range that the optical sensing module 110 captures the images. In some embodiment, the tracking device 100 and the trackable device 200 operate with each other in the same environment. The tracking device 100 and the trackable device 200 are movably disposed in the environment, or held on user's hand or worn on user's body that the trackable device 200 can be moved toward any directions in the environment. The tracking device 100 can detect a position of the trackable device 200 in the FOV, that is, the tracking device 100 can detect whether the trackable device 200 is captured in the image or not and determine the position which the trackable device 200 presents in the image. More detailed statements are showed as following.

The processor 120 is configured to search in the first image a first region corresponding to the IR light and locate in the second image a second region associated with the first region in the first image, and calculate a spatial status of the trackable device 200 according to the second region in the second image.

In some embodiments, the trackable device 200 may only comprise the first illuminating module 201, and the first illuminating module 201 comprise the light emitting diode (LED) that emits the IR light. In the case, the first image which the optical sensing module 110 captures, comprises the image covering the IR light that the first illuminating module 201 emits, and the second image which the optical sensing module 110 captures, comprises the image covering the visible light that the trackable device 200 reflects in the normal environment. The processor 120 searches in the first image the first region corresponding to the IR light, and calculates the position in the second region of the second image for the trackable device 200. Hence, the present disclosure can locate a smaller image region by the IR image and then the image region can be used on the visible image for analyzing the position of the trackable device 200. Therefore, the tracking system can locate the object position fast and reduce the computation time for image analyzing.

In some embodiment, the optical sensing module 110 is capable of sensing the first image with a first field of view (FOV) and sensing the second image with a second FOV, the first FOV substantially overlaps with the second FOV.

In some embodiment, the optical sensing module 110 may be an all-in-one sensor configured with the IR light sensor and the visible light sensor. For example, a single pixel of the all-in-one sensor comprises four subpixels, and the four subpixels comprise three subpixels which are capable of sensing the visible spectrum (e.g. red, green and blue light) respectively and one subpixel which is capable of sensing the IR spectrum. Therefore, the all-in-one sensor captures the first image in the IR spectrum and the second image in the visible spectrum with the same FOV simultaneously.

In some embodiment, the optical sensing module 110 is not limited to the all-in-one sensor configured with the IR light sensor and the visible light sensor. As shown in FIG. 1, the optical sensing module 110 comprises a first camera 111 and a second camera 113, the first camera 111 is capable of sensing the IR spectrum with the first FOV to capture the first image, and the second camera 113 is capable of sensing the visible spectrum with the second FOV to capture the second image. The second camera 113 is disposed adjacent to the first camera 111, and the first FOV substantially overlaps with the second FOV. The first camera 111 and the second camera 113 may sense the IR spectrum to capture the first image and sense the visible spectrum to capture the second image with the same FOV respectively.

In the embodiment that the first FOV substantially overlaps with the second FOV, the optical sensing module 110 captures the first image and the second image simultaneously. The image coordinates of the first image and the second image which are captured by the optical sensing module 110 are substantially the same. The tracking device 100 and the trackable device 200 move in the environment. The optical sensing module 110 senses the IR spectrum which is emitted by the first illuminating module 210 and then captures the first image. Further, the processor 120 searches in the first image the IR light region, which the IR light region is the first region. The first region is the image region that covers the IR light, for example, the proportion of the image pixel number of IR light in the first region to the whole image pixel numbers is more than the proportion of the image pixel number of IR light in the first image to the whole image pixel numbers. It should be noticed that the image processing means may be the image edge detection or detecting the object features in the image such as colors, optical flow, textures or feature points. Any procedures for identifying objects in images and extracting corresponded image region can apply in the tracking system of the present disclosure, but it is not limited thereto. In addition, the first region is part of the first image, any procedures for searching the IR light and extracting the first region vary based on actual requirements, and it is not limited to the contour or the shape of the first region.

In the aforesaid embodiment, the processor 120 applies the image procedure to obtain the first region, and calculates the coordinate of the first region in the image. In one embodiment, the processor 120 records at least one coordinate of the first region in the image. For example, when the first region is a rectangle, the processor 120 records the coordinates of the four vertexes of the first region. It should be noted that, in this embodiment, the processor 120 records the coordinate of the optical sensing module 110 and the image coordinate of the image that the optical sensing module 110 captures. The processor 120 can predict the position the IR light covers in the second image. Therefore, the processor 120 can locate the second region of the second image according to the first region of the first image such that the processor 120 can perform image analyzing at the second region of the second image.

The second illuminating module 203 of the trackable device 200 can emit the visible light. In the embodiment that the optical sensing module 110 senses the visible spectrum to capture the second image, the optical sensing module 110 senses the visible spectrum that emitted by the second illuminating module 203. The processor 120 locates in the second image the second region, and the second region in the second image will cover the visible light emitted by the second illuminating module 203. Hence, the processor 120 calculates the spatial status of the trackable device 200 according to the second region in the second image. The spatial status is, for example, the coordinates of the visible spectrum region in the second image or other representing manner of the light region captured in the second image. Thus, the processor 120 can predict the second region in the second image and the image region outside the second region in the second image (that is, a third region) can be ignored, and the cost and time for image computation can be reduced.

On the other hand, in the embodiment that the first FOV is substantially overlaps with the second FOV, the optical sensing module 110 activates the IR sensing procedure while the optical sensing module 110 does not sense the IR spectrum. Then, the processor 120 suspends the optical sensing module 110 from sensing IR spectrum (or extracting the second image), or the processor 120 suspends the calculation of the spatial status. For example, in the case that the optical sensing module 110 is the all-in-one sensor configured with the IR light sensor and the visible light sensor, the processor 120 may disable the three subpixels (red light, green light and blue light) which can sense the visible spectrum, or ignore the visible light information that the three subpixels sense. In the case that the optical sensing module 110 is configured with the first camera 111 and the second camera 113, the first camera 111 is capable of sensing the visible spectrum and the second camera 113 is capable of sensing the IR spectrum. The processor 120 can disable the second camera 113 of the optical sensing module 110, or ignore the visible light information that the second camera 113 senses. Therefore, the method of using multiple spectrum bands for tracking the object presented in the disclosure can provide the following advantages: preventing from unnecessary image searching, enhancing efficiency of calculating the spatial status, and reducing power consumption due to disabling sensing functions (or disabling the second camera 113) in response that the visible light information should be ignored.

In the aforesaid embodiment, the trackable device 200 has the first illuminating module 201 emitting the IR light, and the most objects (e.g. furniture, television, desks and chairs, etc.) in the normal environments (e.g. the offices, living rooms, an indoor playground, etc.) reflect the light, which can be sensed under the visible spectrum. However, the most objects do not emit the IR light. Accordingly, the IR light pixels sensed in the first image can be determined easily by the tracking device 100 that the IR light pixels are corresponding to the IR light emitted by the first illuminating module 201 of the trackable device 200.

Figure 2:
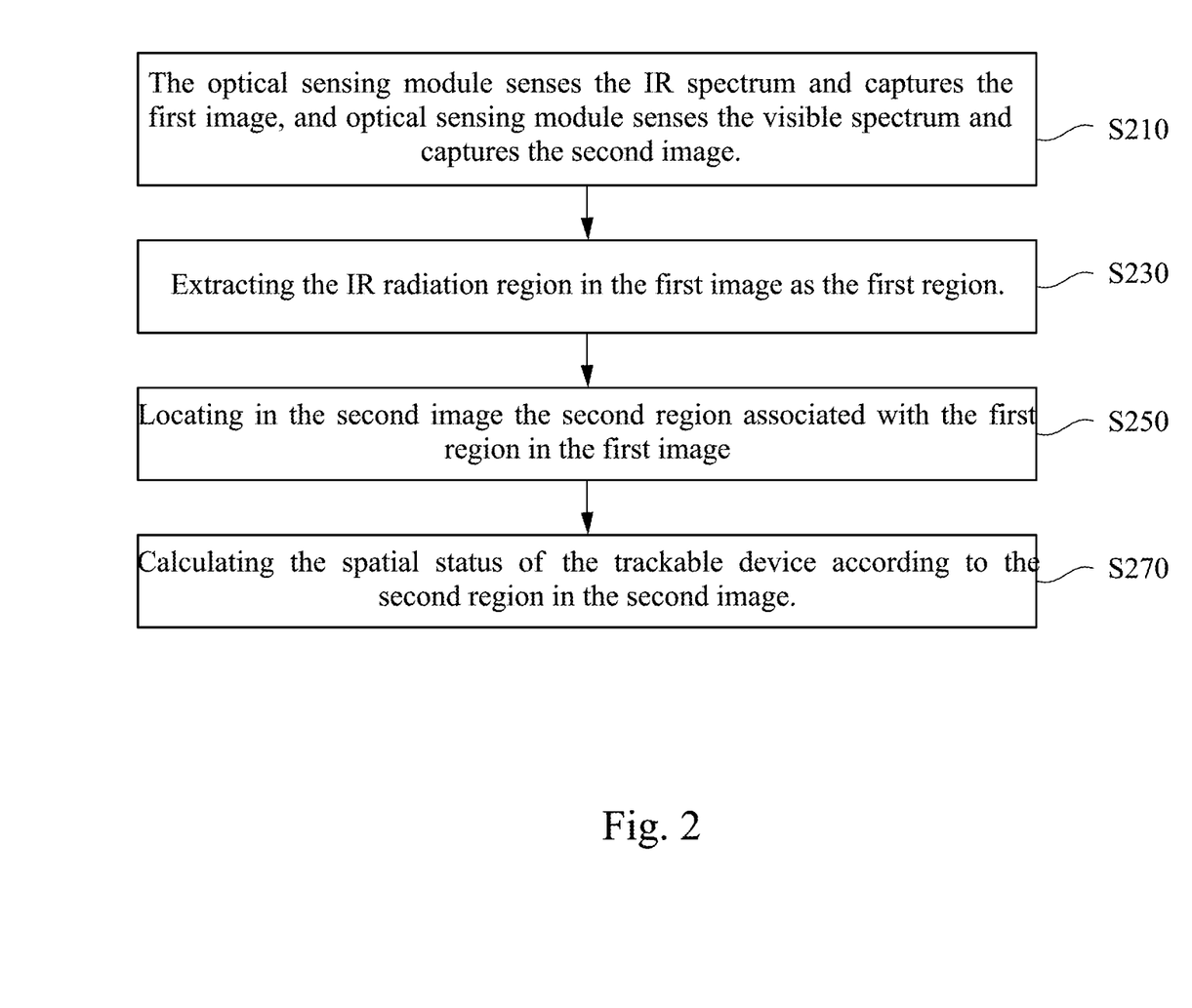
FIG. 2 is a flow diagram illustrating a tracking method according to an embodiment of the disclosure.

Reference is made to FIG. 2, which is a flow diagram illustrating a tracking method according to an embodiment of the disclosure. The tracking method is suitable for the tracking system 10 depicted in FIG. 1.

Reference is further made to FIG. 1 and FIG. 2, the tracking device 100 determines the position of the trackable device 200 in the environment through the tracking method. The tracking device 100 can determine whether the trackable device 200 enters the FOV or not, as shown in operation S210, the optical sensing module 110 senses the IR spectrum and captures the first image and meanwhile senses the visible spectrum and captures the second image. The processor 120 determines in the first image whether the IR spectrum reflects or not based on the image pixels in the first image. In the operation S230, the processor 120 extracts the IR light region to be the first region when the processor 120 determines that the IR light exists in the first image. The processor 120 then determines the corresponding region in the second image based on the first region.

In the operation S250, the processor 120 locates in the second image the second region associated with the first region in the first image. The processor 120 determines the region of the second image corresponding to the IR light region of the first image according to the second region in the second image. In operation S270, the processor 120 calculates the spatial status of the trackable device 200 according to the second region in the second image, and hence obtains the position of the trackable device 200.

Figure 3A:
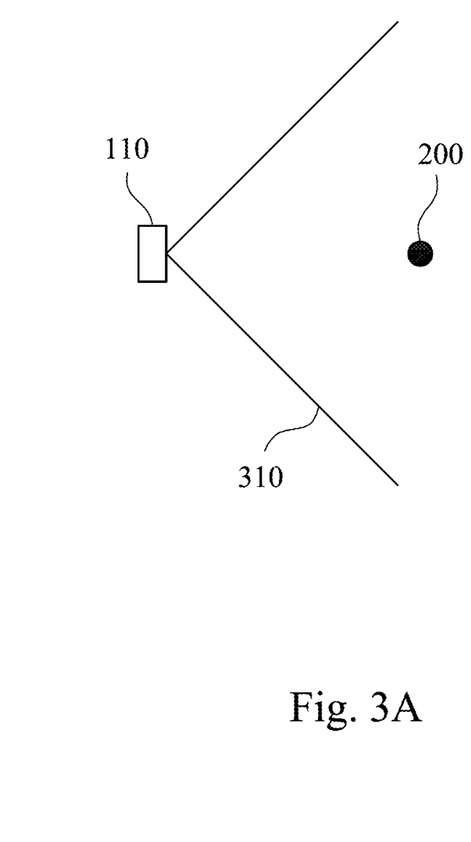
FIG. 3A to FIG. 3B are schematic diagrams illustrating a relation between field of views and images according to an embodiment of the disclosure.
Figure 3B:
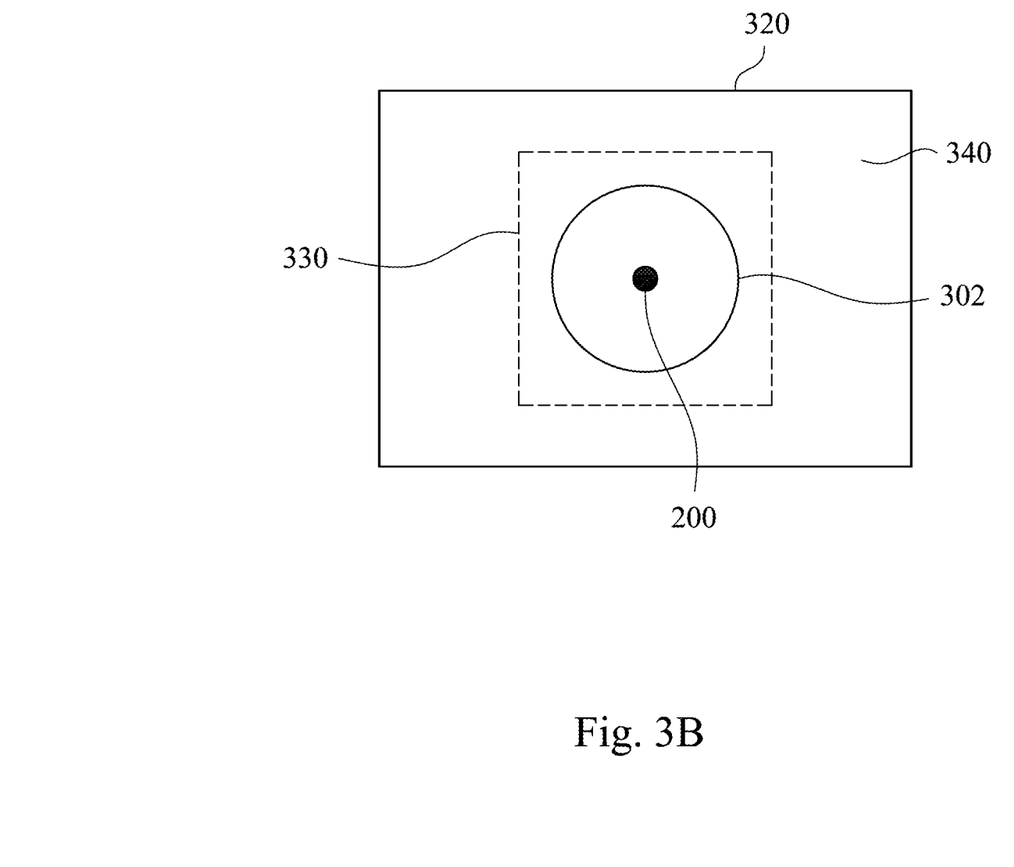

Reference is made to FIG. 3A-FIG. 3B, which are schematic diagrams illustrating a relation between field of views and images according to an embodiment of the disclosure. In the embodiment, the first FOV that the optical sensing module 110 captures the first image substantially overlaps with the second FOV that the optical sensing module 110 captures the second image.

As shown in FIG. 3A, the optical sensing module 110 has the FOV 301, and the trackable device 200 is located in the FOV 301. Referring to FIG. 3B at the same time, the optical sensing module 110 captures the image 320. More specifically, please refer FIG. 1 and FIG. 3A-FIG. 3B, the optical sensing module 110 senses the IR light emitted by the trackable device 200 in order to capture the image 320 (i.e. the first image), and senses the visible light emitted by the trackable device 200 in order to capture the another image 320 (i.e. the first image). The processor 120 analyzes the IR region 302 in the image 320 in order to capture the IR region 302 as the region 330 (i.e. the first region) and calculates the spatial status of the trackable device 200 based on the region 330 (i.e. the second region) which covers the visible spectrum. For this embodiment, because the first FOV substantially overlaps with the second FOA, the first region is substantially the same with the second region (i.e. the region 330). While the processor 120 has determined the second region, it is not necessary to process the region (i.e. third region 340) outside the second region (i.e. region 330) of the second image. Therefore, the computation cost and time can be reduced.

In some embodiment, the region 330 and the IR region 302 shown in FIG. 3A and FIG. 3B contain the same pixel range. In FIG. 3A and FIG. 3B, there are exemplary embodiments for the region 330 and the IR region 302, it is not limited to the region size and so on.

Figure 4A:
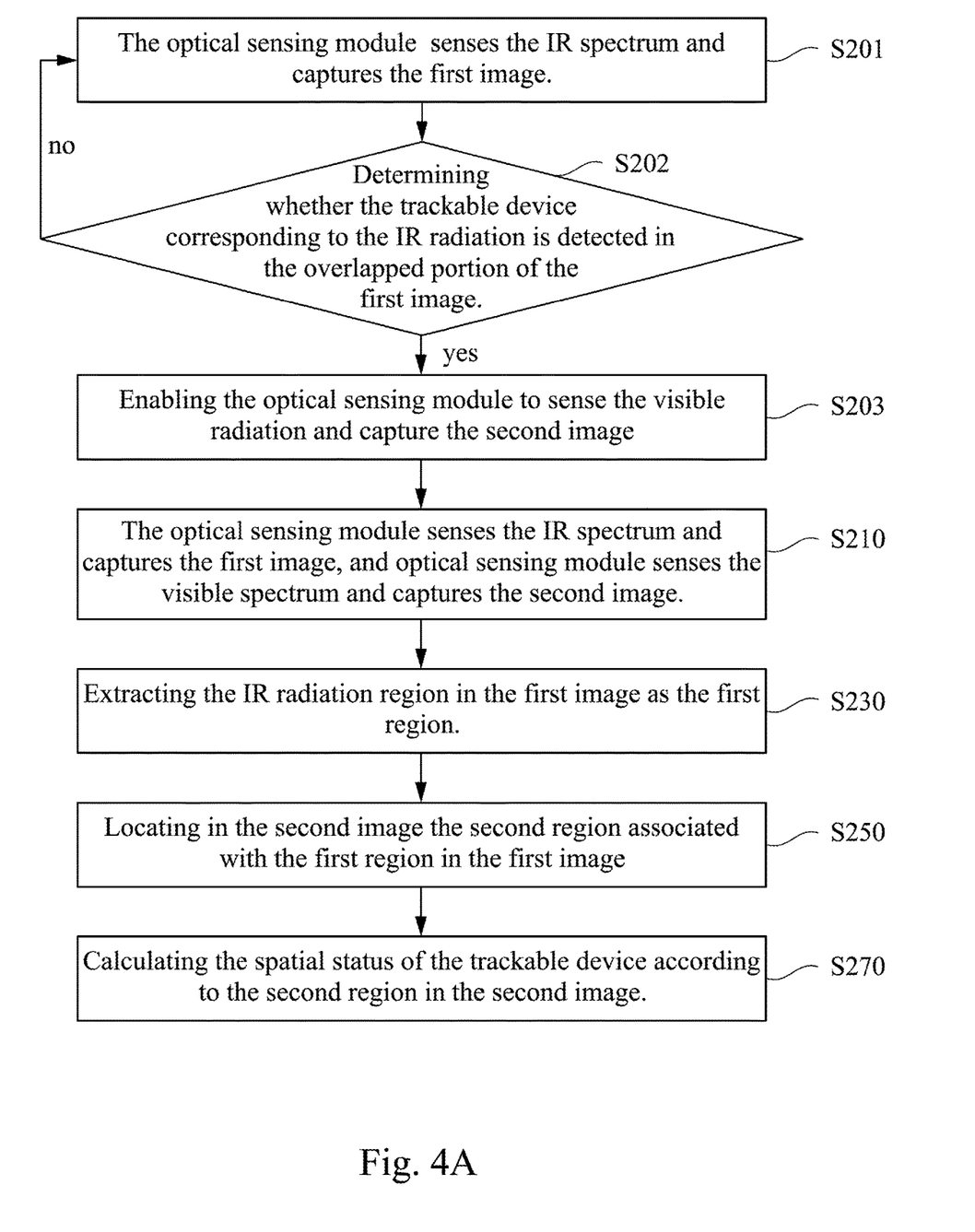
FIG. 4A to FIG. 4B are flow diagrams illustrating the tracking method according to an embodiment of the disclosure.

Reference is made to FIG. 4A, which is flow diagrams illustrating the tracking method according to an embodiment of the disclosure. In these embodiments, the first FOV which the optical sensing module 110 captures the first image is partially overlapped with the second FOV which the optical sensing module 110 captures the second image. In the case, the optical sensing module 110 comprises the first camera 111 and the second camera 114. The first camera 111 and the second camera 113 are disposed adjacent to each other or nearby with a short distance such that there are a partially overlapped portion and non-overlapped portions between the first FOV and the second FOV.

In these embodiments, reference is further made to FIG. 1 and FIG. 4A, the processor 120 can retrieve the position of the first camera 111 and the second camera 113, and perform the coordinate transformation between the first image and the second image, which the coordinate of the camera can be obtained by rotations and shifts. In the operation S201, the optical sensing module 110 can sense the IR spectrum to capture the first image. In the case, the processor 120 determines the overlapped portion between the first FOV and the second FOV, and obtains the relation between the overlapped portion covered by the first FOV and the second FOV, which the overlapped portion is generated at the first image and the second image. For instance, the first camera 111 is disposed on the right side of the second camera 113 at 10 centimeters, so the left portion (e.g. 500 pixels) of the first image (e.g. 1920 pixels in width) in the first FOV is overlapped with the right portion (e.g. 500 pixels) of the second image (e.g. 1920 pixels in width) in the second FOV, which the first image is captured by the first camera 111 and the second image is captured by the second camera 113. By coordinate transformation, any point (x,y) of the first image can be translated to the point (x+c,y) of the second image by adding a constant c to x. In addition, the similar transformation can be applied while the first camera 111 and the second camera 113 are disposed in a vertical distance with each other.

In operation S202, the processor 110 determines whether the trackable device 200 corresponding to the IR light is detected in the overlapped portion of the first image. If the IR light is detected in the overlapped portion, in the operation S203, the processor 120 enables the optical sensing module 110 to sense the visible light and capture the second image.

Specifically, the processor 120 transforms coordinates of at least one points at the first region and determines whether the transformed coordinates of the points lay on the second image (i.e. the FOV for the visible light) or not. For example, the processor 120 controls the optical sensing module 110 to sense the visible spectrum in response that the processor 120 determines the transformed coordinates of the points lay on the second image. The means for coordinate transformations can be, for example, the extrinsic matrix transformation, but it is not limited thereto. The means for determining whether the trackable device 200 moves into the second image (i.e. from the FOV for the IR sensing to the FOV for the visible sensing) by the processor 120 can be, for example, the motion model. The motion model calculates the movement of the object, and whether the object enters within the second image or not can be determined.

Then, in the operations S210-S270, the optical sensing module 110 senses the IR spectrum to capture the second image and senses the visible spectrum to capture the second image such that the processor 120 can obtain a predicted entrance location of the object emitting the IR light in the second image. Specifically, the processor 120 determines the predicated entrance location of the object in the second image according to the foresaid extrinsic matrix transformation and the motion model estimating the moving mode of the object. Hence, the processor 11 can calculate the spatial status of the trackable device 200 according to the second region in the second image.

In operation S202, in case the processor 120 does not detect the trackable device 200 corresponding to the IR light in the overlapped portion of the first image, go back to operation S201. The flow char in FIG. 4A is the operations before the operations in FIG. 2 are executed. As the first FOV and the second FOV are partially overlapped with each other, the present disclosure may determine whether the first image lays on the second image or not (i.e. the determination whether the overlapped portion covers on the IR light image). If the foresaid determination is yes, the operation for sensing the first image and the second image simultaneously in FIG. 2 will be proceeded in order to determine the location of the trackable device 200.

Figure 4B:
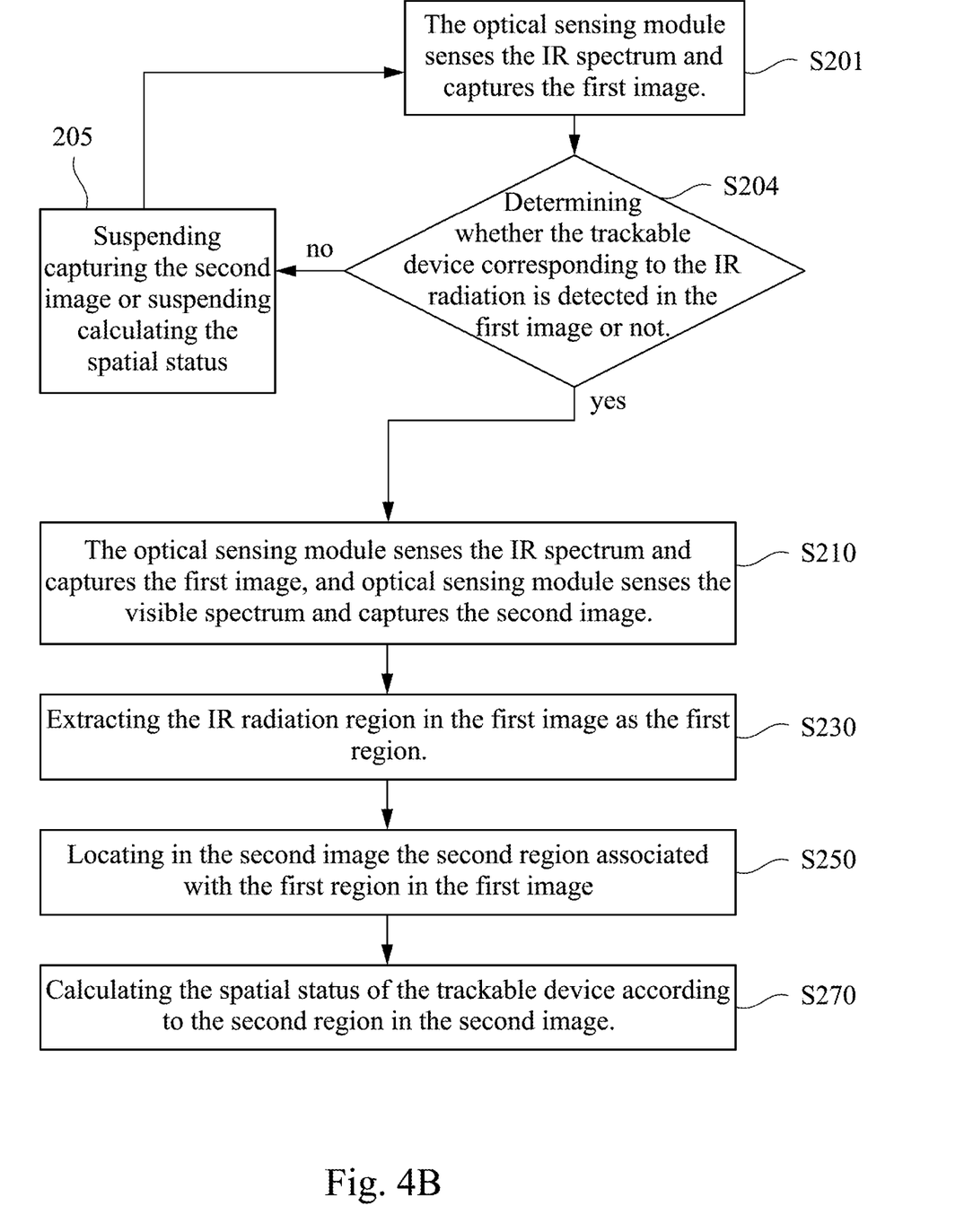

Reference is made to FIG. 4B, which is a flow diagram illustrating the tracking method according to an embodiment of the disclosure.

Referring to FIG. 1 and FIG. 4B, in operation S201, the optical sensing module 110 senses the IR spectrum to capture the first image. In operation S204, the processor 120 determines whether the trackable device 200 corresponding to the IR light is detected in the first image or not. If the foresaid determination is yes, going through the operations S210-S270. The detailed illustrations for operations S210-S270 are shown as above and not repeated in the statement.

In operation S240, if the trackable device 200 corresponding to the IR light is not detected in the first image, the operation S205 will be executed. In operation S205, in the embodiment that the first FOV is substantially overlapped with the second FOV. In the case that the optical sensing module 110 is the all-in-one sensor configured with the IR light sensor and the visible light sensor, the optical sensing module 110 activates the IR spectrum sensing. But in case the IR spectrum is not sensed, the processor 120 controls the optical sensing module 110 to disable the sensing function for the visible light and to suspend capturing the second image, or the processor 120 does not calculate the spatial status. On the other hand, in operation S205, in the case that the optical sensing 110 comprises the first camera 111 which is capable of sensing the IR spectrum and the second camera 113 which is capable of sensing the visible spectrum. The processor 120 can disable the second camera 113 of the optical sensing module 110, or ignore the information that the second camera 113 has sensed. Then, going back to operation S201.

Figure 5A:
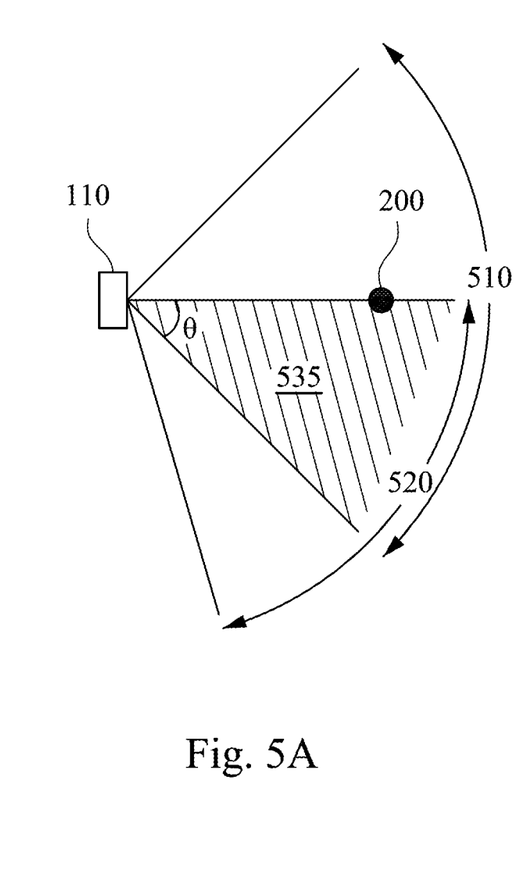
FIG. 5A to FIG. 5B are schematic diagrams illustrating the relation between field of views and images according to an embodiment of the disclosure.
Figure 5B:
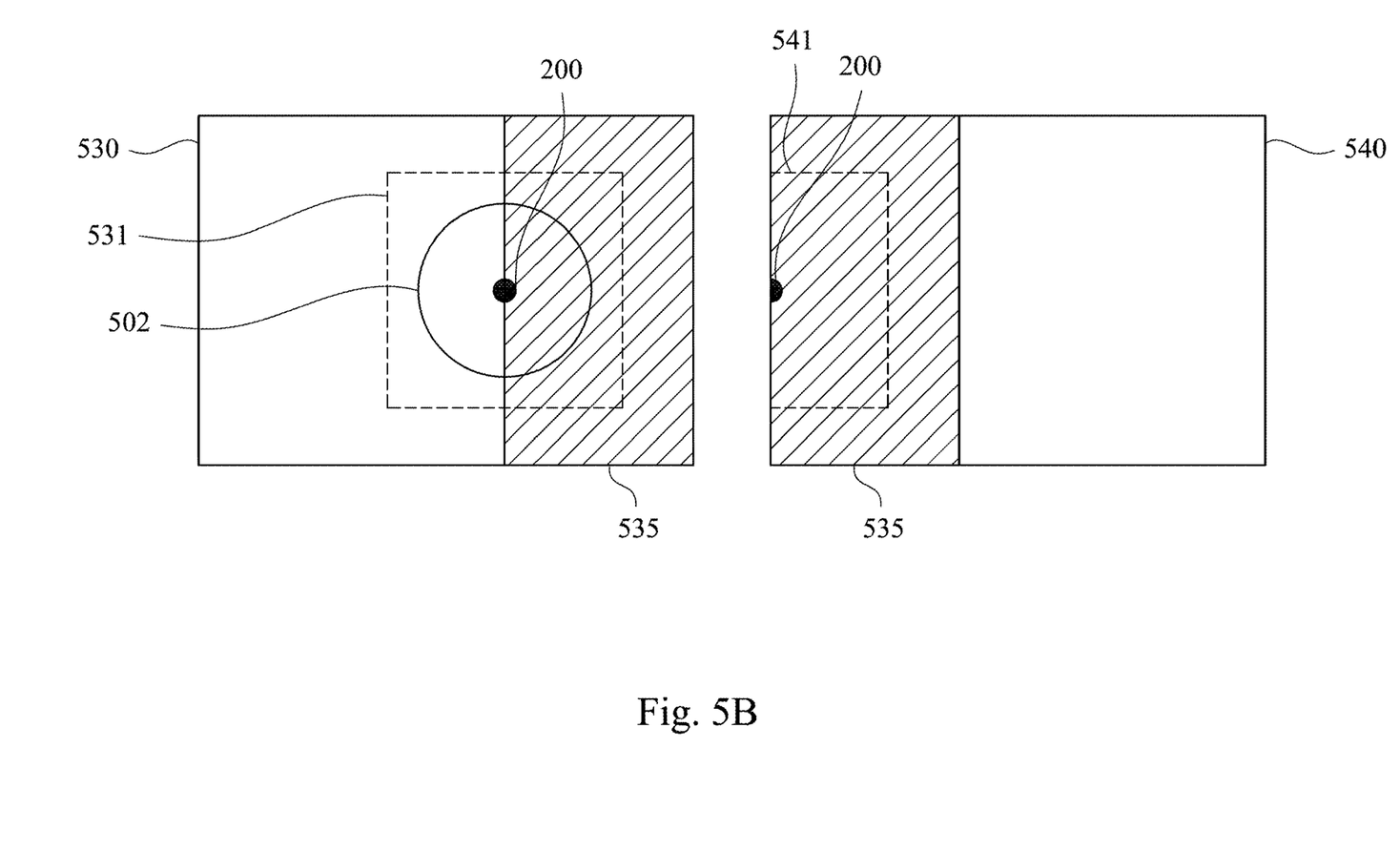

Reference is made to FIG. 5A-FIG. 5B, which are schematic diagrams illustrating the relation between field of views and images according to an embodiment of the disclosure. In the embodiment, the first FOV which the optical sensing module 110 captures the first image is partially overlapped with the second FOV which the optical sensing module 110 captures the second image.

As shown in FIG. 5A, the optical sensing module 110 has the first FOV 510 and the second FOV 520. The first FOV 510 and the second FOV 520 have the overlapped portion 535, and there is a bias angle $\theta$ between the first FOV 510 and the second FOV 520. The trackable device 200 moves dynamically in the first FOV 510 and the second FOV 520. The processor 120 obtains the relation between the overlapped portion 535 generated by the first FOV 510 and the second FOV 520 and the overlapped portion 535 generated by the first image 530 and the second image 540. For example, the value of the bias angle $\theta$ between the first FOV 510 and the second FOV 520 is associated with the size of the overlapped portion 535 in the first image 530 and the second image 540. The bias angle $\theta$ is large, which represents the overlapped portion of the FOV is large, the range of the overlapped portion 535 in the first image 530 and the second image 540 will be large.

Reference is further made to FIG. 5B, the optical sensing module 110 senses the IR light emitted by the trackable device 200 to capture the first image 530. The processor 120 searches an IR region 502 in the first image 530 to capture the IR region 502 to be the first region 531. In some embodiments, the first region 531 and the IR region 502 shown in FIG. 5A are the same pixel region, and FIG. 5A illustrates embodiment of the first region 531 and the IR region 502, but the size of regions are not limited thereto.

The processor 120 determines that the trackable device 200 corresponding to the IR light is detected in the overlapped portion 535 of the first image 530, and then activates the optical sensing module 110 to sense the visible spectrum and capture the second image 540. The processor 120 calculates the second region 541 of the second image 540 corresponding to the first region 531 by the coordinate transformation. Hence, the tracking device 100 can determine the pixel region of the second region 541 in the second image 540 which the trackable device 200 is located. Further, the processor 120 searches the location of the trackable device 200, for example, analyzing the RGB value of the pixel in the second region 541, to obtain the specific location of the trackable device 200 in the second image 540.

In some embodiments, the tracking device 100 shown in FIG. 1 can send a timing signal to the trackable device 200. The processor 205 of the trackable device 200 controls the first illuminating module 201 and the second illuminating module 203 according to the timing signal, for example, the flash mode, flashing frequency and the light color of the first illuminating module 201 and the second illuminating module 203, etc. The tracking device 100 activates the optical sensing module 110 to sense images according to the timing sequence controlling the first illuminating module 201 and the second illuminating module 203 to flash. Therefore, the timing signal is used for interactions and synchronizations between the trackable device 200 and the tracking device 100.

In addition, the second illuminating module 203 of the trackable device 200 can emit visible lights with different brightness and/or colors. When the optical sensing module 110 operates its sensing procedure, the tracking device 100 analyzes images according to a default brightness threshold or a default color range. For example, the optical sensing module 110 only processes the particular pixel region which image pixel value is higher than the default brightness or the default color range (e.g. the specific RGB value), and the pixel regions, except the foresaid particular pixel region, will be ignored. In another embodiment, when the tracking device 100 and the trackable device 200 operate in a dark environment, the tracking device 100 can determine the location of the trackable device 200 in the image more easily due to the visible light emitted by the second illuminating module 203. The present disclosure can work normally without the second illuminating module 203. However, if the second illuminating module 203 is further configured to the trackable device 200, the processor 120 can perform the image calculation and find out the location of the illuminating region in the image more precisely and the tracking procedure for the trackable device 200 can be done more quickly. In addition, because the second illuminating module 203 is further disposed on the trackable device 200, the tracking procedure can be processed properly in the dark environment even though there is not enough visible light except the visible light emitted by the second illuminating module 203 in the operating environment.

In another embodiment, the tracking device of the tracking system comprises the processor, multiple first cameras and multiple second cameras. The multiple first cameras and the multiple second cameras are coupled to the processor respectively. The multiple first cameras connect to the processor through Mobile Industry Processor Interface (MIPI). The multiple second cameras connect to the processor through Serial Peripheral Interface (SPI). For bringing into practice, there may be the different number of the first cameras and the second cameras for actual deployments, but it is not limited thereto.

As illustrating above, the tracking system and the tracking method provided in the present disclosure can track objects in images with multiple spectrums. The IR light image is captured and the rough location of the object will be found, then the precise location of the object in the visible light image will be calculated based on the rough location. The IR image sensing which consumes low cost (e.g. power) is used in the present disclosure, so the detections for object's position can be performed frequently. In addition, it is more easily for image analyzing to locate the position of the trackable device by using the IR lights for sensing images due to the lack of interference in the nature environment. Although the color images record more pixels and contain more detail information, it costs more computations for searching in the image the location of the object. Hence, the rough region of the object is found in IR light images, and then the precise region of the object is found by calculating the color image based on the smaller rough region to achieve low image computation cost. Further, the color images contain detail information such that the computations for the location of the object will be more precisely. For the above statements, the present disclosure determines the object's position in the image fast and precisely with low cost.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:
1. A tracking system, comprising:
a trackable device comprising a first illuminating module, wherein the first illuminating module emits an infrared (IR) light;
a tracking device comprising:
an optical sensor, configured to sense an IR spectrum to capture a first image, and sense a visible spectrum to capture a second image, wherein the IR light is in the IR spectrum; and
a processor coupled to the optical sensor, the processor being configured to:
search in the first image a first region corresponding to the IR light, wherein the first image is an IR light image;
locate in the second image a second region associated with the first region in the first image in response to performing a coordinate transformation between the first image and the second image, wherein the second region in the second image is a region corresponding to the first region in the first image, and the second image is a visible light image; and
calculate a spatial status of the trackable device according to the second region in the second image, such that a position of the trackable device is analyzed in the second region of the second image,
wherein the optical sensor comprises a first camera and a second camera, the first camera is capable of sensing the IR spectrum with a first FOV to capture the first image, and the second camera is capable of sensing the visible spectrum with a second FOV to capture the second image, wherein the second camera is disposed adjacent to the first camera, and the first FOV corresponding to the first image partially overlaps with the second FOV corresponding to the second image so as to generate an overlapped portion;
wherein the processor is further configured to ignore the second image captured by the second camera in response to determining that the IR light, which corresponds to the trackable device, is not detected in the overlapped portion of the first image.

2. The tracking system of claim 1, wherein the first FOV corresponding to the first image substantially overlaps with the second FOV corresponding to the second image, and the processor is further configured to:
suspend the optical sensor from capturing the second image or suspend the calculation of the spatial status, in response to the first region not being found in the first image.

3. The tracking system of claim 1, wherein the processor is further configured to:
enable the optical sensor to capture the second image in the visible spectrum in response to the trackable device in the first image corresponding to the IR light entering the overlapped portion.

4. The tracking system of claim 3, wherein when the optical sensor is enabled to capture the second image in the visible spectrum, the processor is further configured to:
generate an estimated entrance location in the second image; and
determine the second region according to the estimated entrance location.

5. The tracking system of claim 3, wherein a difference between the first FOV and the second FOV is determined by an arrangement of the first camera and the second camera.

6. The tracking system of claim 1, wherein when the processor calculates the spatial status of the trackable device, a third region in the second image outside the second region is ignored.

7. The tracking system of claim 1, wherein the trackable device further comprises a second illuminating module, wherein the second illuminating module emits a visible light.

8. The tracking system of claim 1, wherein when the optical sensor captures the second image, the optical sensor is further configured to process only a particular pixel region with a pixel value that is higher than a predetermined brightness threshold and to ignore other pixel regions.

9. A tracking method, suitable for a tracking system, wherein the tracking system comprises a trackable device and a tracking device, and the tracking device comprises an optical sensor and a processor, the method comprising:
searching, by the processor, a first region corresponding to an IR light in a first image captured by the optical sensor in an IR spectrum, wherein the first image is an IR light image;
locating, by the processor, a second region in a second image captured by the optical sensor in a visible spectrum in response to performing a coordinate transformation between the first image and the second image, wherein the second region in the second image is a region corresponding to the first region in the first image, and the second image is a visible light image; and
calculating, by the processor, a spatial status of the trackable device according to the second region in the second image, such that a position of the trackable device is analyzed in the second region of the second image,
wherein the optical sensor comprises a first camera and a second camera, the first camera is capable of sensing the IR spectrum with a first FOV to capture the first image, and the second camera is capable of sensing the visible spectrum with a second FOV to capture the second image, wherein the second camera is disposed adjacent to the first camera, and the first FOV corresponding to the first image partially overlaps with the second FOV corresponding to the second image so as to generate an overlapped portion, and the method further comprising:
ignoring the second image captured by the second camera in response to determining that the IR light, which corresponds to the trackable device, is not detected in the overlapped portion of the first image.

10. The tracking method of claim 9, wherein the first FOV corresponding to the first image substantially overlaps with the second FOV corresponding to the second image, and the method further comprises:
suspending, by the processor, the optical sensor from capturing the second image or suspending the calculation of the spatial status, in response to the first region not being found in the first image.

11. The tracking method of claim 9, further comprising:
enabling, by the processor, the optical sensor to capture the second image in the visible spectrum in response to the trackable device in the first image corresponding to the IR light entering the overlapped portion.

12. The tracking method of claim 11, wherein when the optical sensor is enabled to capture the second image in the visible spectrum, the method further comprises:
generating, by the processor, an estimated entrance location in the second image; and
determining, by the processor, the second region according to the estimated entrance location.

13. The tracking method of claim 9, wherein the step of calculating, by the processor, the spatial status comprises ignoring, by the processor, a third region in the second image outside the second region.

14. The tracking method of claim 9, further comprising:
when capturing the second image by the optical sensor, processing only a particular pixel region with a pixel value that is higher than a predetermined brightness threshold and ignoring other pixel regions.

* * * * *